(12) United States Patent
Hartung

(10) Patent No.: US 10,422,231 B2
(45) Date of Patent: Sep. 24, 2019

(54) BLADED GAS TURBINE ROTOR

(71) Applicant: MTU Aero Engines AG, Munich (DE)

(72) Inventor: Andreas Hartung, Munich (DE)

(73) Assignee: MTU Aero Engines AG, Munich (DE)

( * ) Notice: Subject to any disclaimer, the term of this patent is extended or adjusted under 35 U.S.C. 154(b) by 383 days.

(21) Appl. No.: 15/231,604

(22) Filed: Aug. 8, 2016

(65) Prior Publication Data

US 2017/0044910 A1 Feb. 16, 2017

(30) Foreign Application Priority Data

Aug. 12, 2015 (EP) ..................................... 15180677

(51) Int. Cl.
*F01D 5/26* (2006.01)
*F01D 5/18* (2006.01)
(Continued)

(52) U.S. Cl.
CPC .............. *F01D 5/186* (2013.01); *F01D 5/225* (2013.01); *F01D 9/02* (2013.01); *F01D 9/065* (2013.01);
(Continued)

(58) Field of Classification Search
CPC ........ F16J 15/064; F16J 15/0881; F01D 5/16; F01D 5/26; F01D 5/17; F01D 5/3061; F01D 5/34; F01D 25/06; F01D 25/24; F01D 29/324; F01D 29/668; F01D 29/322; F01D 29/661; F01D 5/147; F05D 2220/32; F05D 2230/10; F05D 2230/21; F05D 2230/239; F05D 2260/96; F05D 2220/323; Y02T 50/671
See application file for complete search history.

(56) References Cited

U.S. PATENT DOCUMENTS 1,833,754 A * 11/1931 Paget ........................ F01D 5/16
416/215
2,349,187 A * 5/1944 Meyer ........................ F01D 5/16
188/322.5
(Continued)

FOREIGN PATENT DOCUMENTS

DE 102013214932 A1 2/2015
EP 2014872 A2 1/2009
(Continued)

*Primary Examiner* — Justin D Seabe
*Assistant Examiner* — Joshua R Beebe
(74) *Attorney, Agent, or Firm* — Barlow, Josephs & Holmes, Ltd.

(57) ABSTRACT

The present invention relates to a bladed rotor for a gas turbine, with a body and a plurality of rotating blades where contact regions of a cylindrical surface of the body and front faces of the rotating blades are joined together cohesively. At least one of these contact regions and/or at least one of these front faces has at least one blind hole, in which at least one impulse body is arranged with play of movement and which is sealed and rotating blades are joined with the cylindrical surface. Alternatively, the body and rotating blades are manufactured integrally with one another by machining, and at least one blind hole extends from an inner surface of the body facing away from the blade out to one of the rotating blades, at least one impulse body being disposed with play of movement in this hole, and this hole is sealed.

17 Claims, 2 Drawing Sheets

(51) Int. Cl.
  *F23R 3/00* (2006.01)
  *F01D 9/02* (2006.01)
  *F01D 5/22* (2006.01)
  *F01D 11/08* (2006.01)
  *F01D 25/24* (2006.01)
  *F01D 25/12* (2006.01)
  *F02C 7/18* (2006.01)
  *F01D 9/06* (2006.01)

(52) U.S. Cl.
  CPC .............. *F01D 11/08* (2013.01); *F01D 25/12* (2013.01); *F01D 25/24* (2013.01); *F02C 7/18* (2013.01); *F23R 3/002* (2013.01); *F05D 2220/32* (2013.01); *F05D 2240/35* (2013.01); *F05D 2240/81* (2013.01); *F05D 2260/202* (2013.01); *F23R 2900/03042* (2013.01); *Y02T 50/676* (2013.01)

(56) References Cited

U.S. PATENT DOCUMENTS

| | | | | |
|---|---|---|---|---|
| 2,462,961 A * | 3/1949 | Harker | ............... | B64C 11/008 188/266 |
| 2,862,686 A * | 12/1958 | Bartlett | ............... | F01D 5/16 416/213 R |
| 2,930,581 A * | 3/1960 | Klint | ............... | F01D 5/26 416/219 R |
| 2,984,453 A * | 5/1961 | Heymann | ............... | F01D 5/16 416/229 A |
| 2,997,274 A * | 8/1961 | Hanson | ............... | F01D 5/26 416/140 |
| 2,999,669 A * | 9/1961 | McGinnis | ............... | F01D 5/16 416/229 A |
| 3,609,841 A * | 10/1971 | Tefler | ............... | F01D 5/3061 219/121.14 |
| 5,366,344 A * | 11/1994 | Gillbanks | ............... | B23K 20/1205 228/112.1 |
| 6,102,664 A * | 8/2000 | Nguyen | ............... | F01D 5/26 416/248 |
| 6,827,551 B1 * | 12/2004 | Duffy | ............... | F01D 5/16 415/119 |
| 7,300,256 B2 * | 11/2007 | Masserey | ............... | F01D 5/16 416/230 |
| 7,448,844 B1 * | 11/2008 | Johnson | ............... | F03B 3/12 29/402.08 |
| 9,765,625 B2 * | 9/2017 | Stiehler | ............... | F01D 5/10 |
| 2003/0202883 A1 * | 10/2003 | Davis | ............... | F01D 5/16 416/248 |
| 2014/0348657 A1 * | 11/2014 | Stiehler | ............... | F01D 5/10 416/190 |
| 2016/0326881 A1 | 11/2016 | Hartung | | |

FOREIGN PATENT DOCUMENTS

| | | |
|---|---|---|
| EP | 2806105 A1 | 11/2014 |
| EP | 3091181 A1 | 11/2016 |
| WO | 2012065595 A1 | 5/2012 |

\* cited by examiner

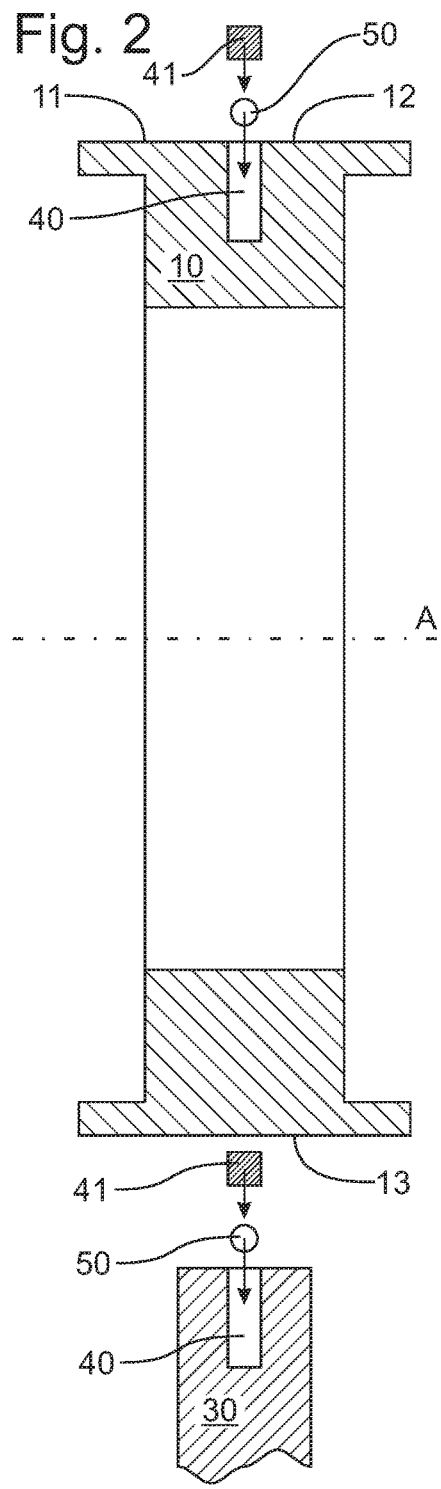
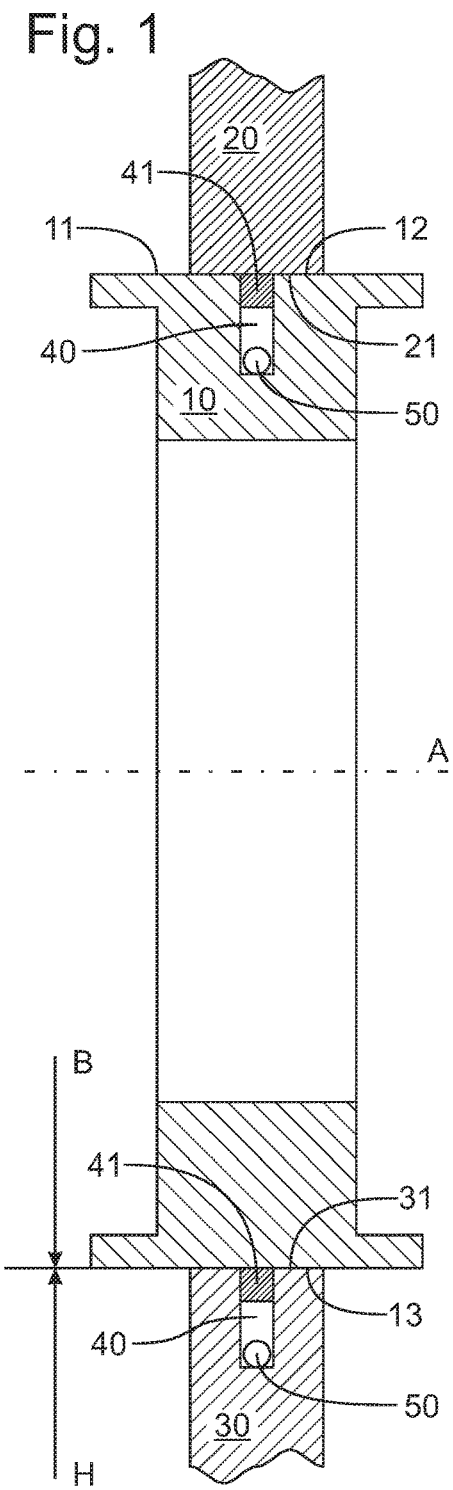

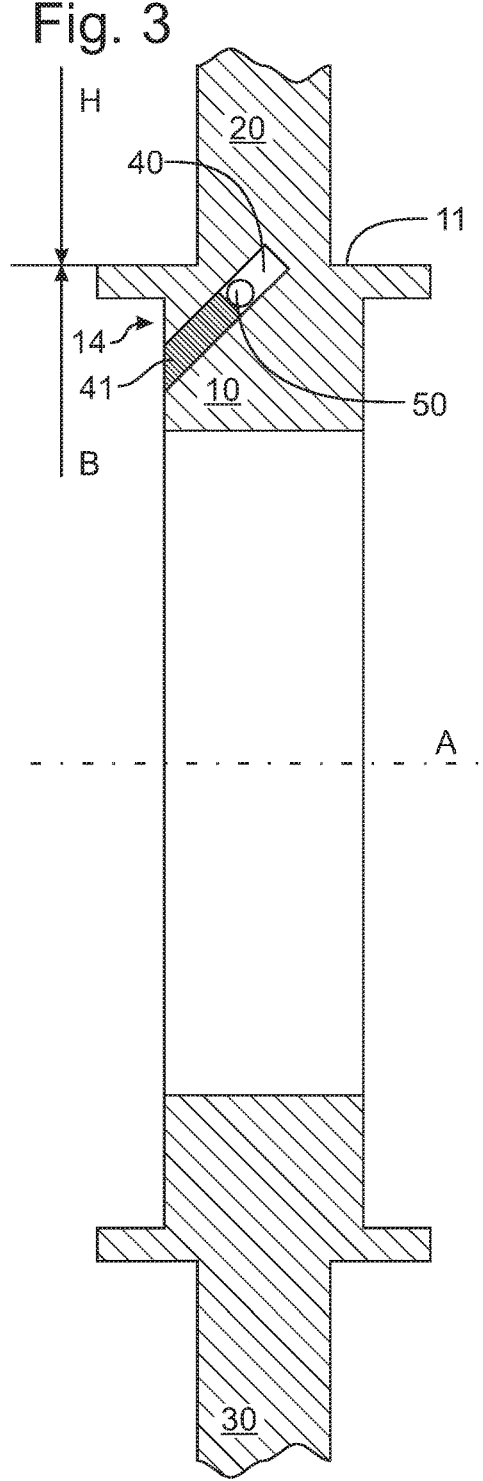

BLADED GAS TURBINE ROTOR

BACKGROUND OF THE INVENTION

The studies that have led to this invention were supported according to the Financial Aid Agreement No. CSJU-GAM-SAGE-2008-001 under the Seventh Framework Program of the European Union (FP7/2007-2013) for Clean Sky Joint Technology Initiative.

The present invention relates to a bladed rotor for a gas turbine, a gas turbine, in particular an aircraft engine gas turbine, having at least one such bladed rotor, as well as a method for manufacturing the bladed rotor.

A turbomachine blade having an impulse body that is disposed or arranged with play of movement in an impact chamber in a blade element or a blade root is known from EP 2 806 105 A1. The impact chamber can be sealed either by a welded cover or by a rotor of the turbomachine.

SUMMARY OF THE INVENTION

An object of one embodiment of the present invention is to improve a gas turbine and/or the manufacture thereof.

This object is achieved by a bladed rotor in accordance with the present invention. Advantageous embodiments of the invention are discussed in detail below.

According to one aspect of the present invention, a bladed rotor for a gas turbine, in particular for an aircraft engine gas turbine, in particular a bladed rotor for a compressor or for a turbine of the gas turbine, in particular a bladed rotor of a gas turbine, in particular of an aircraft engine gas turbine, in particular a bladed rotor of a compressor, and/or a bladed rotor of a turbine of the gas turbine, has a basic body and a plurality of rotating blades, wherein contact regions of a cylindrical surface of the basic body and front faces of the rotating blades are or will be joined together cohesively, and one or more of these contact regions and/or one or more of these front faces (in each case) has (have) one blind hole or a plurality of blind holes, in each of which one or more impulse body (bodies) is (are) disposed with play of movement or will be disposed prior to joining together the respective rotating blade and contact region, and the hole being sealed in addition to the joining of the rotating blade with the cylindrical surface or will be sealed after arrangement of the impulse body or the impulse bodies and prior to the joining together of the respective rotating blade and contact region.

The blind holes are in fact already sealed or will be sealed by the joining of the rotating blades to the cylindrical surface. By means of the additional sealing of blind holes, however, more advantageous impact conditions of the impulse bodies in the blind holes can be realized, and/or the subsequent joining of the blades with the basic body can be improved.

In one embodiment, the contact regions and front faces are or will be joined together by welding, in particular by friction welding. An advantageous joining can be created thereby, in particular with respect to manufacturing and/or production engineering.

In one embodiment, the cylindrical surface is a radially outer cylindrical surface, the front faces of the rotating blades correspondingly are particularly radially inner front faces, each time referred to an axis of rotation or principal axis of the rotor.

According to another aspect of the present invention, a bladed rotor for a gas turbine, in particular for an aircraft engine gas turbine, in particular a bladed rotor for a compressor or for a turbine of the gas turbine, in particular a bladed rotor of a gas turbine, in particular of an aircraft engine gas turbine, in particular a bladed rotor of a compressor, and/or a bladed rotor of a turbine of the gas turbine, has a basic body and a plurality of rotating blades, wherein basic body and rotating blades are or will be manufactured integrally with one another by machining, in particular by milling, and one blind hole or a plurality of blind holes extend(s) from an inner surface of the basic body facing away from the blade (back) out to one of the rotating blades, or one blind hole or a plurality of blind holes will be manufactured, which extend or (each of which) extends from an inner surface of the basic body facing away from the blade (back) out to one of the rotating blades, in particular to a transition region or radially inner blade root of the rotating blade, wherein, in the blind hole or in (each) blind hole, one impulse body or a plurality of impulse bodies is (are) disposed or will be disposed with play of movement after the manufacture of the respective blind hole, and which is or are sealed or will be sealed after the arrangement of the one or more respective impulse bodies.

By introducing the impulse body or the impulse bodies from an inner surface of the basic body facing away from the blade, advantageously, a flow channel, which is defined by a radially outer cylindrical surface of the basic body, from which the rotating blades extend radially outward, is not disrupted, whereby, at the same time, by the extension of the blind hole back to a rotating blade, this rotating blade can be advantageously detuned.

In one embodiment, the inner surface facing away from the blade can have, in particular can be, a radially inner (referred to an axis of rotation or principal axis of the rotor) cylindrical surface and/or front face of the basic body.

In one embodiment, a base or a bottom of a blind hole in the axial and peripheral directions (referred to an axis of rotation or principal axis of the rotor) is disposed underneath a rotating blade, in particular underneath its root profile or section. In the radial direction (again referred to an axis of rotation or principal axis of the rotor), the base or bottom of the blind hole can be disposed below, above, or, at least essentially, at the level of the root profile or section of the rotating blade or its radially inner end of its leading or trailing edge. The rotating blade can be particularly advantageously detuned in this way.

According to both aspects, the bladed rotor is thus a so-called BLISK in each case, i.e., a rotor with integrated rotating blades, wherein basic body and rotating blades are cohesively joined to one another, in particular by welding, in particular by friction welding, or are or will be manufactured integrally with one another by machining.

According to both aspects, a concept that is explained in detail in EP 2 806 105 A1 can be realized, according to which vibration modes of blades essentially cannot be attenuated dissipatively, but can be detuned by impact contacts of the impulse bodies, and thus undesired vibrations of the blades can be reduced. In this respect, reference is additionally made to EP 2 806 105 A1, and the content thereof is included in the present disclosure.

It has been shown surprisingly that in the case of such BLISKs, due to the concept of detuning by impulse bodies that execute impacts, vibration problems can be reduced particularly advantageously.

The basic body can be designed as annular, in particular at least substantially annular, in particular as a closed ring in the peripheral direction. A plurality of such annular rotors can then be or will be combined into a compressor or a turbine of the gas turbine.

A blind hole presently particularly designates a recess or a closed drilled hole or a hole that is not a through-hole, which extends from a surface into the material, in particular the basic body or the rotating blade, and for which the (front) side lying opposite the surface is closed or does not completely penetrate the material. In one embodiment, it can be manufactured by machining, in particular by drilling, or it can be or will be pre-formed with the basic body or the rotating blade.

In a blind hole, an impulse body can have a play of movement in the peripheral, radial, and/or axial direction(s), each time referred to an axis of rotation or principal axis of the rotor, and/or a lengthwise direction or extension direction of the blind hole or of the drilled hole. In one embodiment, in at least one of these directions, the play of movement is at least 10 μm, in particular at least 0.05 mm, in particular at least 0.5 mm, and/or at most 1.5 mm, in particular at most 1.2 mm, in particular at most 0.8 mm.

According to one embodiment, one or more of the blind holes is (are) or will be sealed cohesively, in particular by welding. According to one embodiment, one or more of the blind holes is (are) or will be sealed by a separate cover. In this way, an advantageous seal can be realized, in particular with respect to the intended impact dynamics.

The cover can seal the blind hole in a form-fit and/or friction-fit manner, in particular by means of press fitting. Additionally or alternatively, it can seal the blind hole cohesively, in particular by welding. In one embodiment, the cover is or will be inserted into the blind hole, in particular completely inserted, or it can be taken up or arranged in this hole, and, in an enhancement, can be welded with or in this hole.

According to one embodiment, precisely one impulse body or a single impulse body is or will be disposed in each of the one or more blind holes. In this way, advantageous individual impact dynamics can be utilized. In this case, for detuning different vibration modes, blind holes can be or will be disposed at several places, the holes having the same or different dimensions and/or impulse bodies, in particular the same number or different numbers of impulse bodies and/or impulse bodies with the same or different dimensions and/or weights.

According to one embodiment, one impulse body or a plurality of impulse bodies is (are) or will be disposed each time in a radial region that extends radially inward and/or outward from a maximum outer diameter of the basic body radially by maximally 10% of a radial blade height of the rotating blades, in each case referred to an axis of rotation or principal axis of the rotor. It has been shown surprisingly that an arrangement of impulse bodies in this radial region can reduce undesired vibrations particularly advantageously in BLISKs.

BRIEF DESCRIPTION OF THE DRAWING FIGURES

Additional advantageous enhancements of the present invention can be taken from the following description of preferred embodiments. For this purpose and partially schematized:

FIG. 1 shows a bladed rotor according to an embodiment of the present invention in an axial section;

FIG. 2 shows steps of a method for manufacturing the rotor according to an embodiment of the present invention; and FIG. 3 shows a bladed rotor according to another embodiment of the present invention in an axial section.

DESCRIPTION OF THE INVENTION

FIG. 1 shows a bladed rotor in the form of a BLISK of a compressor or of a turbine of an aircraft engine gas turbine according to an embodiment of the present invention in an axial section along an axis of rotation or principal axis A of the gas turbine or of the rotor.

The BLISK has an annular basic body 10 and a plurality of rotating blades 20, 30, wherein contact regions 12, 13 of a radially outer (referred to the axis of rotation or principal axis A) cylindrical surface 11 of the basic body 10 and front faces 21, 31 of the rotating blades 20, 30 are or will be joined together cohesively by friction welding, as indicated by the figure sequence FIG. 2 then to FIG. 1.

As an example, the contact region 12 and the front face 31 each have a blind hole 40, in which an impulse body 50 is disposed with play of movement in each case (see FIG. 1) or will be disposed or arranged prior to the joining together of the respective rotating blade 20, 30 and contact region 12, 13, as is indicated by the figure sequence FIG. 2 then to FIG. 1 and assembling arrows in FIG. 2.

In addition to the joining of the rotating blades to the cylindrical surface, the blind holes 40 are or will be sealed each time by a cover 41 after the arrangement of the respective impulse body 50 in the blind hole 40 and prior to the joining together of the respective rotating blade 20, 30 and contact region 12, 13, as is indicated by the figure sequence FIG. 2 then to FIG. 1 and assembling arrows in FIG. 2.

The covers 41 are or will be welded into the blind holes 40 and completely taken up in the latter. In this case, the blind holes are or will be sealed cohesively by welding.

The blind holes 40 are in fact already sealed by the joining of the rotating blades to the cylindrical surface. By means of the additional sealing of blind holes, however, more advantageous impact conditions of the impulse bodies 50 in the blind holes 40 can be realized, and/or the subsequent joining of the blades 20, 30 with the basic body 10 can be improved.

It has been shown surprisingly that in the case of such BLISKs, due to the concept of detuning by impulse bodies, which execute stochastic impacts, vibration problems can be reduced particularly advantageously.

As can be recognized in FIGS. 1, 2, the blind holes or closed drilled holes or non-through-holes 40 extend from a surface into the material of the basic body 10 or of the rotating blade 30 and on the front side lying opposite to this surface are closed or do not completely penetrate the material. They can be manufactured by machining, in particular by drilling, or they can be or will be pre-formed with the basic body or with the rotating blade.

By way of example, the impulse bodies 50, in the respective blind hole 40, have a play of movement in the radial direction, referred to a lengthwise direction or extension direction of the blind hole or the drilled hole 40.

The impulse bodies 50 are each arranged in a radial region (vertical in FIG. 1), which extends radially inward and outward from a maximum outer diameter B of the basic body 10 radially by maximally 10% of a radial blade height H of the rotating blades 20, 30.

FIG. 3 shows a bladed rotor in the form of a BLISK of a compressor or of a turbine of an aircraft engine gas turbine according to another embodiment of the present invention in a representation corresponding to FIG. 1. Features corresponding to each other are identified by identical reference numbers, so that reference is made to the preceding description and only differences will be discussed in the following.

In the case of the BLISK of FIG. 3, basic body 10 and rotating blades 20, 30 are or will be milled together from the solid block and in this way are manufactured integrally with one another.

Subsequently, one blind hole or a plurality of blind holes 40 will be manufactured by machining, in particular by drilling, which extend from an inner surface 14 of the basic body 10 facing away from the blade out to one of the rotating blades, a blind hole 40 being shown by way of example in FIG. 3.

Impulse bodies 50 are or will be disposed in the blind holes 40. The blind holes 40 are or will be sealed by the covers 41 welded in them.

By introducing the impulse bodies 50 from the inner surface 14 of the basic body 10 facing away from the blade, a flow channel defined by the opposite-lying radially outer cylindrical surface 11 advantageously will not be disrupted, whereby, at the same time, by extending the blind holes 40 to a rotating blade, this rotating blade advantageously will be detuned.

A base or bottom of the blind hole 40 is disposed in the axial direction (horizontal in FIG. 3) and in the peripheral direction (perpendicular to the image plane of FIG. 3) underneath the rotating blade 20, in particular below its root profile or section. In the radial direction (vertical in FIG. 3), the base or bottom of the blind hole 40 is disposed approximately at the level of the root profile or section of the rotating blade 20 or the radial inner end thereof of its leading or trailing edge.

Although exemplary embodiments were explained in the preceding description, it shall be noted that a plurality of modifications is possible. In addition, it shall be noted that the exemplary embodiments only involve examples that in no way shall limit the scope of protection, the applications and the construction. Rather, a guide is given to the person skilled in the art by the preceding description for implementing at least one exemplary embodiment, whereby diverse changes, particularly with respect to the function and arrangement of the described components, can be carried out without departing from the scope of protection, as it results from the claims and combinations of features equivalent to these.

What is claimed is:

1. A bladed rotor for a gas turbine, comprising:
   a basic body and a plurality of rotating blades, wherein contact regions of a cylindrical surface of the basic body and front faces of the rotating blades are joined together cohesively, and at least one of these contact regions has at least one blind hole, in which at least one impulse body is arranged with play of movement and which is sealed, in addition to the joining of the rotating blades with the cylindrical surface,
   wherein at least one of the impulse bodies is disposed in a radial region, which extends radially inward and/or outward from a maximum outer diameter of the basic body radially by maximally 10% of a radial blade height of the rotating blades.

2. The bladed rotor according to claim 1, wherein at least one of the blind holes is sealed cohesively by welding.

3. The bladed rotor according to claim 1, wherein at least one of the blind holes is sealed by a separate cover.

4. The bladed rotor according to claim 1, wherein a single impulse body is disposed in at least one of the blind holes.

5. The bladed rotor according to claim 1, wherein the bladed rotor is configured and arranged for use in an aircraft engine gas turbine having at least one compressor and/or at least one turbine.

6. The bladed rotor according to claim 1, wherein at least one of the front faces includes at least one additional blind hole, in which at least one additional impulse body is arranged with play of movement and which is sealed, in addition to the joining of the rotating blades with the cylindrical surface.

7. A method for manufacturing a bladed rotor for a gas turbine, comprising the steps of:
   providing a basic body and a plurality of rotating blades;
   joining together cohesively contact regions of a cylindrical surface of the basic body and front faces of the rotating blades; at least one of the contact regions having at least one blind hole;
   previously arranging at least one impulse body with play of movement;
   sealing the impulse body after the step of arranging and prior to the step of joining together of the respective rotating blades and the contact regions,
   wherein at least one of the impulse bodies is disposed in a radial region, which extends radially inward and/or outward from a maximum outer diameter of the basic body radially by maximally 10% of a radial blade height of the rotating blades.

8. The method according to claim 7, wherein the cylindrical surface and front faces are joined together by friction welding.

9. The method according to claim 7, wherein at least one of the blind holes is sealed cohesively by welding.

10. The method according to claim 7, wherein at least one of the blind holes is sealed by a separate cover.

11. The method according to claim 7, wherein a single impulse body is disposed in at least one of the blind holes.

12. The method according to claim 7, wherein at least one of the front faces includes at least one additional blind hole and previously arranging at least one additional impulse body with play of movement in the at least one additional blind hole.

13. A bladed rotor for a gas turbine, comprising:
   a basic body and a plurality of rotating blades, wherein the basic body and the rotating blades are manufactured integrally with one another by machining, and
   at least one blind hole extending through an inner surface of the basic body and through a portion of at least one rotating blade, at an angle offset from both an axial and radial direction, in which at least one impulse body is arranged with play of movement and which is sealed.

14. The bladed rotor according to claim 13, wherein at least one of the blind holes is sealed by a separate cover.

15. The bladed rotor according to claim 13, wherein a single impulse body is disposed in at least one of the blind holes.

16. The bladed rotor according to claim 13, wherein the inner surface of the basic body faces away from the blade.

17. A bladed rotor for a gas turbine, comprising:
   a basic body and a plurality of rotating blades, wherein contact regions of a cylindrical surface of the basic body and front faces of the rotating blades are joined together cohesively, and at least one of these contact regions has at least one blind hole, in which at least one impulse body is arranged with play of movement and which is sealed, in addition to the joining of the rotating blades with the cylindrical surface, wherein the contact regions and front faces are joined together by friction welding, and wherein at least one of the impulse bodies is disposed in a radial region, which extends radially inward and/or outward from a maximum outer diameter of the basic body radially by maximally 10% of a radial blade height of the rotating blades.

\* \* \* \* \*